(12) United States Patent
Feng et al.

(10) Patent No.: US 10,650,261 B2
(45) Date of Patent: May 12, 2020

(54) SYSTEM AND METHOD FOR IDENTIFYING RE-PHOTOGRAPHED IMAGES

(71) Applicant: Alibaba Group Holding Limited, George Town, Grand Cayman (KY)

(72) Inventors: Xuetao Feng, Beijing (CN); Yan Wang, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 126 days.

(21) Appl. No.: 16/045,548

(22) Filed: Jul. 25, 2018

(65) Prior Publication Data
US 2019/0034746 A1    Jan. 31, 2019

(30) Foreign Application Priority Data
Jul. 28, 2017   (CN) .......................... 2017 1 0632714

(51) Int. Cl.
| G06K 9/00 | (2006.01) |
| G06T 7/00 | (2017.01) |
| G06T 3/40 | (2006.01) |
| G06T 7/70 | (2017.01) |
| G06K 9/62 | (2006.01) |
| G06K 9/03 | (2006.01) |

(Continued)

(52) U.S. Cl.
CPC ..... *G06K 9/00906* (2013.01); *G06K 9/00228* (2013.01); *G06K 9/00281* (2013.01); *G06K 9/00288* (2013.01); *G06K 9/036* (2013.01); *G06K 9/3233* (2013.01); *G06K 9/627* (2013.01); *G06T 3/40* (2013.01); *G06T 3/4007* (2013.01); *G06T 7/0002* (2013.01); *G06T 7/70* (2017.01); *G06K 2009/4666* (2013.01); *G06T 2207/10016* (2013.01); *G06T 2207/20076* (2013.01); *G06T 2207/20081* (2013.01); *G06T 2207/20084* (2013.01); *G06T 2207/30168* (2013.01); *G06T 2207/30201* (2013.01)

(58) Field of Classification Search
None
See application file for complete search history.

(56) References Cited

U.S. PATENT DOCUMENTS

| 9,607,138 B1 | 3/2017 | Baldwin |
| 2013/0208103 A1 | 8/2013 | Sands |
| 2014/0037184 A1 | 2/2014 | Gorski |

(Continued)

*Primary Examiner* — Dov Popovici
(74) *Attorney, Agent, or Firm* — Shun Yao; Park, Vaughan, Fleming & Dowler LLP (57) ABSTRACT

One embodiment facilitates identification of re-photographed images. During operation, the system obtains a sequence of video frames of a target object. The system selects a frame with an acceptable level of quality. The system obtains, from the selected frame, a first image and a second image associated with the target object, wherein at least one of a zoom ratio property and a size property is different between the first image and the second image. The system inputs the first image and the second image to at least a first neural network to obtain scores for the first image and the second image, wherein a respective score indicates a probability that the corresponding image is re-photographed, wherein a re-photographed image is obtained by photographing or recording an image of the target object. The system indicates the selected frame as re-photographed based on the obtained probabilities.

20 Claims, 8 Drawing Sheets

(51) Int. Cl.
  *G06K 9/32* (2006.01)
  *G06K 9/46* (2006.01)

(56) References Cited

U.S. PATENT DOCUMENTS

| | | |
|---|---|---|
| 2014/0270411 A1 | 9/2014 | Shu |
| 2015/0110366 A1 | 4/2015 | Sezille |
| 2015/0341370 A1 | 11/2015 | Khan |
| 2016/0034786 A1 | 2/2016 | Suri |
| 2016/0063235 A1 | 3/2016 | Tussy |
| 2016/0283787 A1 | 9/2016 | Nepomniachtchi |
| 2016/0307029 A1 | 10/2016 | Vaknin |
| 2016/0379042 A1* | 12/2016 | Bourlai .............. G06K 9/00288 382/118 |
| 2017/0060867 A1 | 3/2017 | Moutinho |
| 2017/0061563 A1 | 3/2017 | Falkenstern |

* cited by examiner

SYSTEM AND METHOD FOR IDENTIFYING RE-PHOTOGRAPHED IMAGES

RELATED APPLICATION

Under 35 U.S.C. 119, this application claims the benefit and right of priority of Chinese Patent Application No. 201710632714.8, filed 28 Jul. 2017.

BACKGROUND

Field

This disclosure is generally related to data processing. More specifically, this disclosure is related to a system and method for identifying re-photographed images.

Related Art

The progress of technology includes automatic facial recognition (AFR) technology. In recent years, AFR technology has developed rapidly and is being used in an increasingly large number of applications, e.g., account login, attendance-checking and signing in, opening stores, issuing cards, performing transactions, and authentication of off-line servicing staff.

While AFR can be used in a large number of applications, AFR technology can be prone to attacks. For example, an attacker can execute a spoofing attack by using a very realistic re-photographed image to conduct an illegitimate operation. A re-photographed image can include, e.g.: an image obtained by photographing images printed on papers; an image or video obtained by photographing or making a video recording of images or videos displayed on a display, including a video of a face which is synthesized by software or based on a remote video call; and an image obtained by photographing or making a video using an image-capturing device (such as a camera, a video recorder, or a terminal device with an image-capturing or a video-recording function). As further examples, an attacker can bypass an identification verification system by, e.g.: using a pre-recorded facial video with movement and posture changes; using a facial video with movement and posture changes which are synthesized by photos; and using printed facial photos to create a three-dimensional mask.

Detection of re-photographed images may be especially challenging in a mobile application environment, such as via a mobile device. Because of the numerous ways to obtain facial video, "liveness detection" (e.g., detection of authentication spoofing via re-photographed facial images or video) is a technological area which is hindered by the inability to completely eliminate authentication spoofing (e.g., via bypassing a liveness detection function or application).

Thus, while AFR technology is being used in many applications, some challenges remain in maintaining the security of identification authentication and specifically, in accurately identifying re-photographed images.

SUMMARY

One embodiment provides a system for facilitating identification of re-photographed images. During operation, the system obtains, by a computing device, a sequence of video frames of a target object. The system selects a frame with an acceptable level of quality. The system obtains, from the selected frame, a first image and a second image associated with the target object, wherein at least one of a zoom ratio property and a size property is different between the first image and the second image. The system inputs the first image and the second image to at least a first neural network to obtain scores for the first image and the second image, wherein a respective score indicates a probability that the corresponding image is re-photographed, wherein a re-photographed image is obtained by photographing or recording an image of the target object. The system indicates the selected frame as re-photographed based on the obtained probabilities for the first image and the second image.

In some embodiments, the first image and the second image are one or more of: an image of a first size selected from a first area of the target object in the selected frame; an image which is selected from a second area of the target object in the selected frame, and which is zoomed to a second size; and the selected frame zoomed to a third size, wherein the first size, the second size, and the third size are a same size or a different size.

In some embodiments, the zoom ratio property is a ratio of a target image size of the first image or the second image to an original image size of a target zooming area in the selected frame, and the zoom ratio property includes a length-based ratio and a width-based ratio.

In some embodiments, the first image and the second image are inputted to the first neural network and at least one second neural network and a sorter, and output vectors of at least two pre-determined layers of the first neural network and the at least one second neural network are output to the sorter.

In some embodiments, the first image and the second image are zoomed to a same size and are concatenated to form a multichannel image. The first neural network extracts and sorts features of the multichannel image to obtain a score for the multichannel image. Indicating the selected frame as re-photographed is further based on the obtained score for the multichannel image.

In some embodiments, selecting the frame with an acceptable level of quality comprises: evaluating the sequence of video frames to determine a set of frames with the acceptable level of quality, wherein the acceptable level of quality is greater than a first predetermined threshold, and wherein evaluating the sequence of video frames is based on determining scores for features associated with a respective frame, including a first score for a posture, a second score for a brightness, and a third score for a definition.

In some embodiments, the target object is a face.

In some embodiments, prior to selecting the frame, the method further comprises: determining position information of the face in the selected frame; and representing the position information as a rectangular shaped area, wherein the position information is inputted along with the first image and the second image to the first neural network.

In some embodiments, the video frames are obtained from a client computing device associated with a user. In response to determining that there are no frames with the acceptable level of quality, the system: generates a message for the user of the client computing device, wherein the message instructs the user to use the client computing device to capture an image or a video of the user's face; and in response to sending the message to the user, the system obtains, from the client computing device, one or more new frames from which the computing device selects the frame with the acceptable quality.

In some embodiments, indicating the selected frame as re-photographed is further based on one or more of: reviewing the obtained probabilities; and training a sorter to process the obtained probabilities. Reviewing the obtained probabilities involves: selecting a largest value from the obtained probabilities; and in response to determining that the largest value is greater than a first predetermined threshold, indicating the selected frame as re-photographed. Training a sorter to process the obtained probabilities involves: training the sorter based on training images which are either re-photographed images or non-re-photographed images to obtain as output scores or probability value vectors from multiple images of each training image; and comparing the output scores or probability value vectors with a second predetermined threshold to indicate if the training image is re-photographed.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which addresses the challenges of current AFR technology by identifying re-photographed images. In recent years, AFR technology has developed rapidly and is being used in an increasingly large number of applications. However, AFR technology can be prone to attacks. An attacker can execute a spoofing attack by using a very realistic re-photographed image to conduct an illegitimate operation. A re-photographed image can include, e.g.: an image obtained by photographing images printed on papers; an image or video obtained by photographing or making a video recording of images or videos displayed on a display, including a video of a face which is synthesized by software or based on a remote video call; and an image obtained by photographing or making a video using an image-capturing device (such as a camera, a video recorder, or a terminal device with an image-capturing or a video-recording function). As further examples, an attacker can bypass an identification verification system by, e.g.: using a pre-recorded facial video with movement and posture changes; using a facial video with movement and posture changes which are synthesized by photos; and using printed facial photos to create a three-dimensional mask.

"Liveness detection" is the detection of whether an image is of a live human being, and can include detection of authentication spoofing via, e.g., re-photographed facial images or video. Detection of re-photographed images may be especially challenging in a mobile application environment, such as via a mobile device. Because of the numerous ways to obtain facial images or video, "liveness detection" is a technological area which is hindered by the inability to completely eliminate authentication spoofing. Thus, while AFR technology is being used in many applications, some challenges remain in maintaining the security of identification authentication and specifically, in accurately identifying re-photographed images.

One challenge in accurately identifying re-photographed images to effect liveness detection is that the appearance of a photographed object can be complex and unpredictable. Even objects of the same kind may include many variable factors (e.g., for a human face, the variable factors can include the posture, expression, appearance, shields/hair, ornaments, cosmetics, and movements). Furthermore, discrepancies in the lighting caused by the environment may affect the appearance of the image in different ways.

Another challenge in accurately identifying re-photographed images to effect liveness detection is that the imaging devices themselves may be complex and unpredictable. For example, the image-capturing component on mobile devices can vary greatly, depending on the brand, model, parameters, and digital image generation modules, which can affect and result in further variance in features, e.g., definition, color orientation, noise level, optical deformation, and encoding distortion.

The current AFR technology does not take into account the differences between a re-photographed facial image and a real facial image, nor does the current AFR technology use the uniqueness of the human face as a specific type of object. Furthermore, current feature extraction methods cannot ensure a theoretically optimal effect, because they are not specifically designed for the recognition of re-photographed images.

The embodiments described herein address these challenges by providing a system which: uses multiple images of different spatial scales associated with a target object (e.g., a human face in an image); evaluates the quality of an image and selects facial images with a quality which exceeds a certain threshold; and trains and employs a neural network for describing the features of images. These enhancements result in a system which improves the accuracy of identifying re-photographed images, which in turn improves the ability of the system to perform accurate and effective liveness detection. In other words, by accurately identifying re-photographed images, and thus by improving liveness detection, the embodiments described herein can improve user authentication and other AFR-related tasks in many useful, concrete, and practical applications.

Furthermore, the embodiments described herein provide improvements to the protection of network security, where the improvements are fundamentally technological. Embodiments of the present invention provide a technological solution (e.g., obtaining multiple images of different spatial scales, selecting highest quality images, and using a trained neural network to identify re-photographed images) to the technological problem of the efficiency and security involved in AFR technology, including in the fields of liveness detection, prevention of authentication spoofing, and other related fields.

The terms "image," "frame," and "image frame" are used interchangeably, and refer to a single visual representation in electronic form (e.g., a picture or a photograph or a frame of a video).

High-Level Overview of Features of Exemplary Embodiment

The embodiments described herein use multiple images of different spatial scales associated with the human face as an input. The spatial scales can be based on a zoom ratio property of a cut out image and/or the size of the cut out image. In using technology to detect a human face, it may be observed that re-photographed images may include some distinctive features which do not exist in images which are not re-photographed images. These features may include the pixel particles of the display, moiré pattern, definition, color and contrast, and reflection, as well as the frames of the photographed image or the devices which capture the image, the frames of a face image synthesis software, video player software, etc. The pixel particles of the display and the moiré pattern may be most easily spotted in images with a high density of pixels, and images which have not gone through pixel compression. The definition feature is a feature which can be extracted after the image is normalized based on the size of the photographed object, which can yield a positive sorting effect. The color and contrast features are features which may be relatively consistent with respect to facial skin. The other features may only be observed based on the scope of the entire image.

The embodiments described herein use multiple target images of different types associated with a target object in order to differentiate distinctive features from different angles. A target image can be one of a plurality of images associated with the target object, such as a face, in an original image or a frame. A target image which has not gone through pixel compression may be obtained from the original image of the face. For example, a system may use the entire original image as the target image, or the system may cut out (i.e., crop or select) a part from the facial area in the original image as the target image while maintaining the size of the cut out image. For these types of target images, the system can determine whether the original image or frame is a re-photographed image based on features of these target images, such as the pixels particles of the display, the moiré pattern, color and contrast, etc.

The system can also zoom the cut out part from the facial area in the original image as the target image. For this type of target image, the system can determine whether the original image or frame is a re-photographed image based on the definition feature, the features of the frames of the photographed image or the devices which capture the image, the frames of the face image synthesis software, video player software, etc.

In the embodiments described herein, the system can obtain at least M types of target images associated with a target object (such as a face in a frame), based on the results of detecting the position of the target objects in the frame in N original images (e.g., that the same face is present in at least two original images or frames). Thus, the number of target images associated with a target object (such as a face in a frame) is at least N×M, where N is an integer greater than or equal to 1, and M is an integer greater than or equal to 2.

For example, when the system can obtain at least two target images from an original image, where the target images are associated with the target object (such as a face in an image or video frame), the system can determine whether the original image is a re-photographed image. The system can also determine whether the original image is a re-photographed imaged after obtaining and determining that the target images meet a certain predetermined condition, e.g., the target images have an area that is greater than or equal to a predetermined threshold with respect to the original image.

Exemplary Network and Communication

Figure 1:
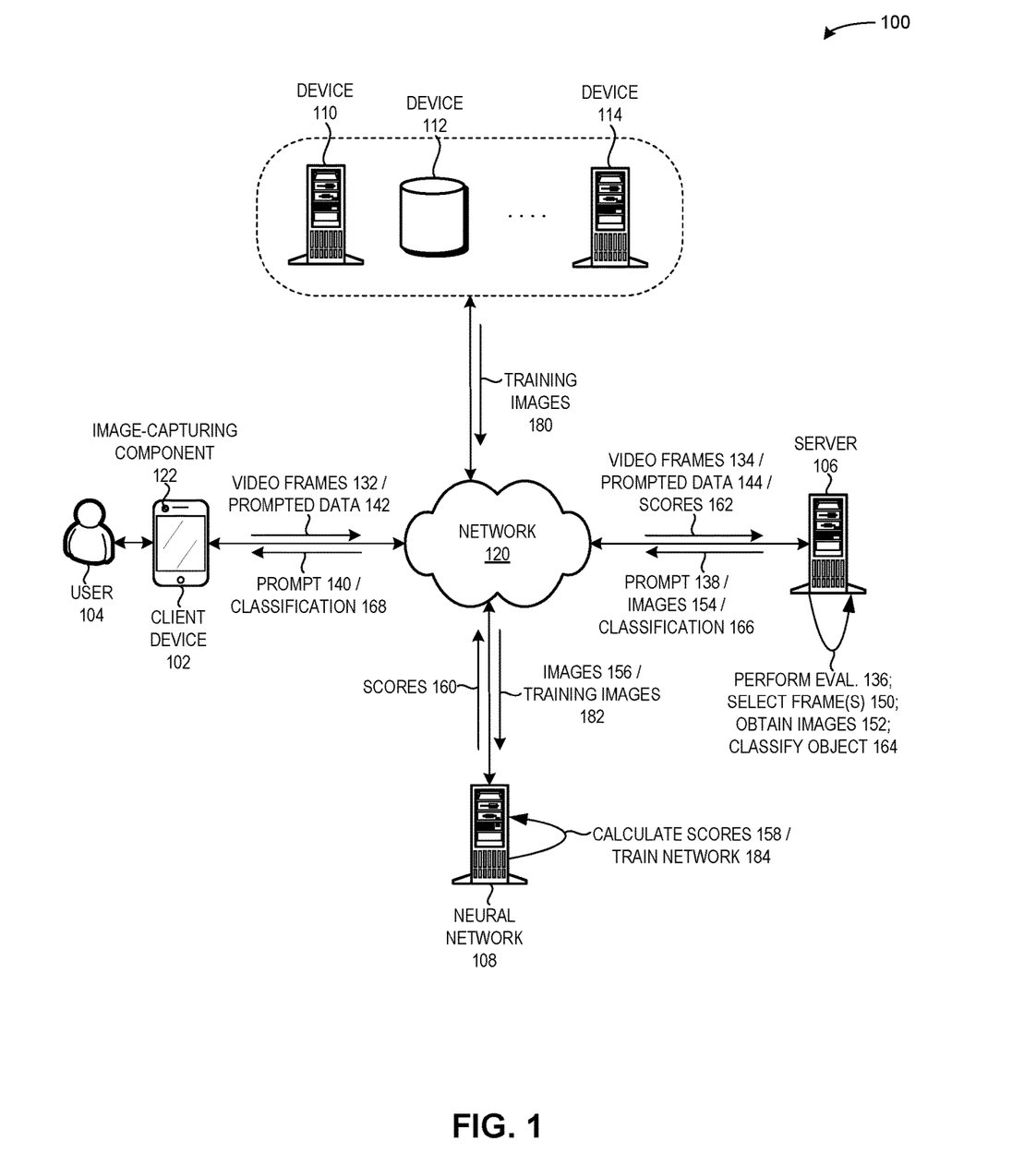
FIG. 1 illustrates an exemplary environment and communication for facilitating identification of re-photographed images, in accordance with an embodiment of the present application.

FIG. 1 illustrates an exemplary environment and communication 100 for facilitating identification of re-photographed images, in accordance with an embodiment of the present application. Environment 100 can include: a user 104 associated with a client device 102; a server 106; a neural network 108; and devices 110-114. These entities can communicate with each other via a network 120, or via a wired connection (not shown). Client device (or client computing device) 102 can include a microphone (not shown) and an image capturing component 122. Client device 102 can be a mobile phone, a tablet, a notebook computer, a laptop computer, a desktop computer, a handheld computer, a personal digital assistant, an electronic reader, a portable media player, and a wearable device. Server 106 can be a computing device which can receive video frames, perform evaluations, select frames, obtain target images, and classify images (or image frames). Neural network 108 can be a server which acts as a neural network. Neural network 108 can include more layers and components than depicted in FIG. 1, and can be trained using data from, e.g., devices 110-114. Devices 110-114 can be any computing device, including a storage device, a storage server, and a distributed storage system.

During operation, user 104 may attempt to perform a network-related operation or an authentication operation using an AFR technology, e.g., as part of a network security check for an identity verification or authentication process, logging into an account, conducting an online transaction, etc. User 104 can send, via client device 102, a sequence of video frames 132 of a target object (such as the face of user 104) to server 106, as part of an authentication identification or verification process. Server 106 may receive video frames 132 (as video frames 134), and perform some functions. Server 106 can perform an evaluation on the video frames (perform evaluation 136) to obtain frames for which the evaluation yields a result greater than a predetermined threshold for an acceptable level of quality, as described below in relation to FIG. 3A. Server 106 can select the highest quality frame(s) (select frame(s) 150), which are frames for which the evaluation yields a result greater than a predetermined threshold. Server 106 can also obtain a plurality of target images associated with a target object in a selected frame (obtain images 152). The target images can be of different types as described above, such as an entire image, an entire image which is zoomed to a particular size, a cut out part of the image of a particular size, and a cut out part of the image which is zoomed to a particular size. Server 106 can send the obtained images 154 to neural network 108.

Neural network 108 can receive images 154 (as images 156), and input the received images 156 into the neural network to obtain as output a corresponding score for each image in images 156 (calculate scores 158). Neural network 108 can send the calculated stores 160 back to server 106. Server 106 can receive scores 160 (as scores 162), and, based on these scores 160, server 106 can classify the target object in the selected frame as either a re-photographed image or a non-re-photographed image (classify object 164). Server 106 can send a classification 166 back to client device 102. Client device 102 can receive classification 166 (as classification 168), and user 104 can proceed with the network-related operation user 104 was attempting to conduct using the AFR technology.

In some embodiments, after server 106 performs the evaluation on the video frames (function 136), server 106 may determine that it requires additional data from the user in order to proceed. For example, server 106 can generate and send a prompt 138 to client device 102. Prompt 138 can include instructions for the user to capture an image or record a video of the user's face, e.g., from a certain angle or direction, or for a certain period of time, or under a certain type of environmental condition (lighting, indoor/outdoor, etc.). User 104 can receive prompt 138 (as prompt 140), perform the requested instructions using image-capturing component 122 on client device 102 (or another device), and transmit (via client device 102) prompted data 142. Prompted data can include one or more new frames from which server 106 can subsequently select the frame with the acceptable quality (function 150), and proceed as described above. Server 106 can received prompted data 142 (as prompted data 144), perform the evaluation (function 136) based on the newly received frames of prompted data 144, and proceed as described above.

Either client device 102 or server 106 can determine position information of the target object (e.g., the face) in a frame, which position information may be used by either client device 102 or server 106 to obtain the first image and the second image (i.e., to perform the obtain images 152 function).

Exemplary Method for Facilitating Identification of Re-Photographed Images

Figure 2:
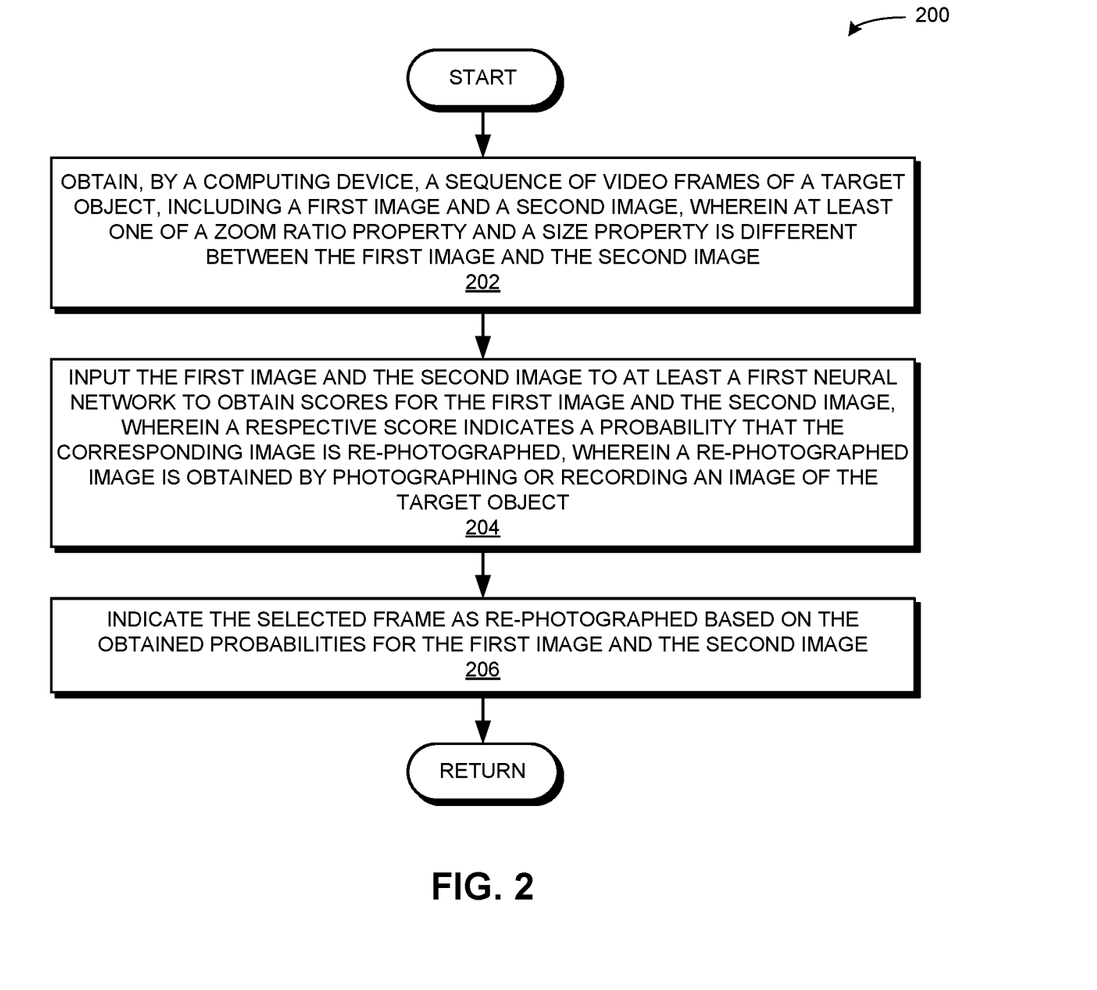
FIG. 2 presents a flowchart illustrating a method for facilitating identification of re-photographed images, in accordance with an embodiment of the present application.

FIG. 2 presents a flowchart 200 illustrating a method for facilitating identification of re-photographed images, in accordance with an embodiment of the present application. This exemplary method can be used for identifying whether an original image is a re-photographed image of a target object. The original image may include an image obtained from an image-capturing device (e.g., a camera, a video-recorder, and a terminal device with an image-capturing or video-recording function). The target object may include parts of a live body (such as a human face), and may also include inanimate objects (such as an identification card).

During operation, the system obtains, by a computing device, a sequence of video frames of a target object, including a first image and a second image, wherein at least one of a zoom ratio property and a size property is different between the first image and the second image (operation 202). The zoom ratio property can be a ratio of a target image size of the first image or the second image to an original image size of a target zooming area in the frame. The size of an image may be represented by a length and a width, based on pixels as a unit of measure. That is, the total number of pixels in one image frame is equal to the number of pixels in the length direction multiplied by the number of pixels in the width direction. Thus, the zoom ratio property can include a length-based ratio (i.e., a zoom ratio in the length direction) or a width-based ratio (i.e., a zoom ratio in the width direction). The size of the first image and the second image can be the same or different.

Figure 5:
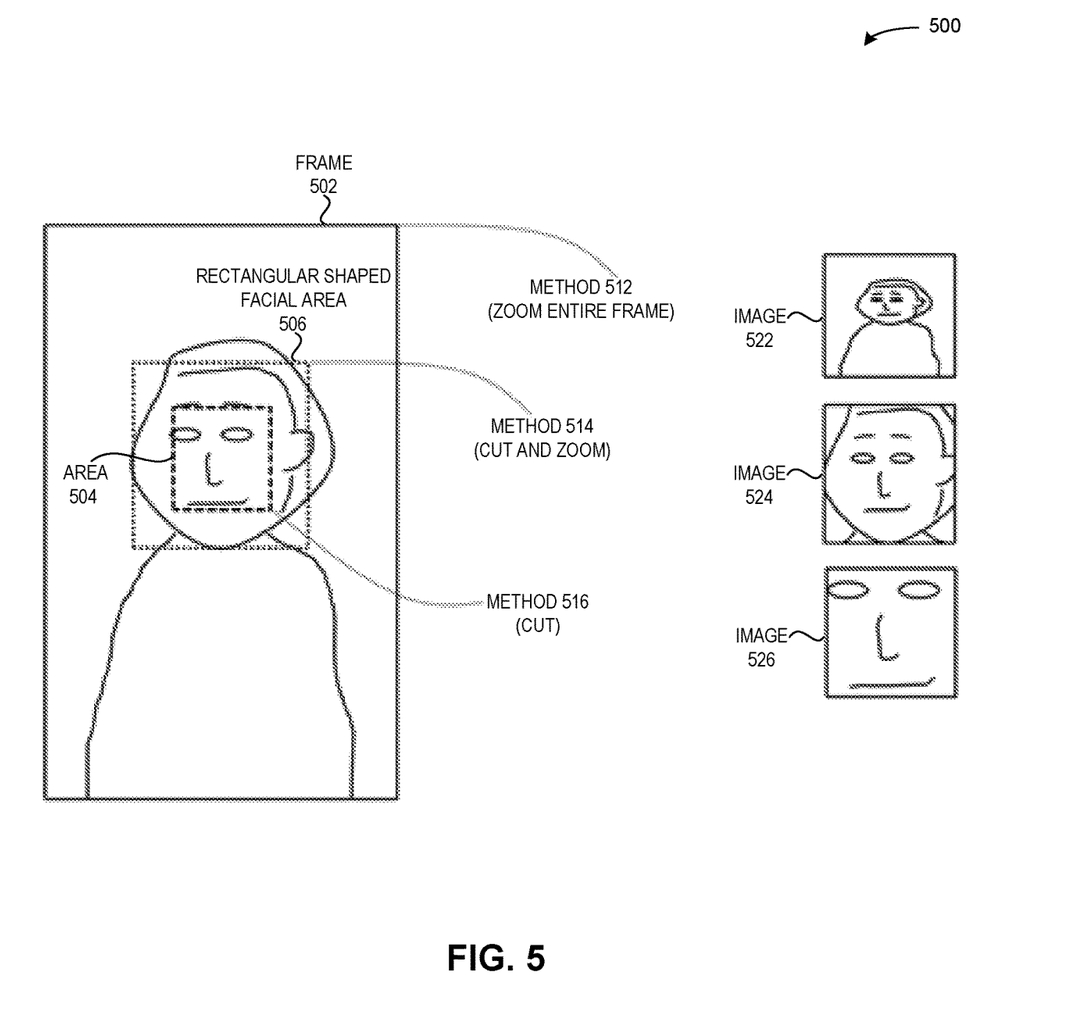
FIG. 5 presents exemplary images associated with a face in a frame, wherein the exemplary images are obtained based on three methods, in accordance with an embodiment of the present application.

For example, the first image and the second image can be one of the following types: an image of a first size selected from a first area of the target object in the selected frame (corresponding to method 516 and image 526 in FIG. 5); an image which is selected from a second area of the target object in the selected frame, and which is zoomed to a second size (corresponding to method 514 and image 524 in FIG. 5); and the selected frame zoomed to a third size (corresponding to method 512 and image 522 in FIG. 5).

The system inputs the first image and the second image to at least a first neural network to obtain scores for the first image and the second image, wherein a respective score indicates a probability that the corresponding image is re-photographed, wherein a re-photographed image is obtained by photographing or recording an image of the target object (operation 204).

As part of operation 204, the system can perform feature extraction and sorting via neural network algorithms, where the output of the neural network is the probability that the first image and the second image are re-photographed images. The system can use a neural network with a convolution layer, a full connection layer, a pooling layer, a non-linear activation layer, etc. The system may use a neural network such as a Visual Geometry Group (VGG) network, a Zeiler Fergus (ZF) network, a GoogLeNet network, a Deep Residual Learning for Image Recognition (ResNet) network, a SqueezeNet network, etc. The system can train the neural networks independently based on a large quantity of image data (e.g., images) which are categorized or labeled as re-photographed images or non-re-photographed images. The system may use one neural network for each type of image frame (e.g., in this case, a first neural network for the first image, and a second neural network for the second image). That is, multiple target images of different types can be sent to different neural networks after being zoomed to the same size. This allows the output vectors of a certain layer (e.g., the pooling layer) in multiple networks to be connected as the input of a sorter. The system can then perform "fusion" of the probabilities at a feature level to classify a target image as re-photographed or non-re-photographed. The system can also adopt a neural network as the sorter, in which case the system can perform an end-to-end training, such that the output of the neural network as the sorter is the indication of the target image as re-photographed based on the calculated and obtained probabilities.

The system can also input the first image and the second image to at least two neural networks and a sorter, where one neural network (of the two) is trained to process a certain type of image (as described above for the exemplary types of images, and as described below in relation to FIG. 5). The output vectors of at least two predetermined layers of the neural networks (e.g., the pooling layer) can be output to the sorter.

In some embodiments, the system can connect (e.g., concatenate) multiple different target images to form a multichannel image, and send the multichannel image through one network to extract and sort the features to obtain the indication of the target image as re-photographed based on the different target images. For example, given the three 3-channel colored images of a resolution of 128×128 pixels in FIG. 5 (described below), the system can connect (or concatenate) the three images 522, 524, and 526 to obtain a single 9-channel image with a resolution of 128×128.

Thus, by using neural networks, the embodiments described herein can minimize the loss of cross-entropy in the sample collection, and obtain fully connected neural network parameters and sorters for describing the features of the images, which can improve the accuracy of the extraction and the sorting of the features.

The system indicates the selected frame as re-photographed based on the obtained probabilities for the first image and the second image (operation 206). The system can classify whether the selected frame is a re-photographed frame or image based on the obtained probabilities for the first image and the second image. For example, the system can select a largest value from the obtained probabilities, and compare that largest value to a first predetermined threshold, to determine whether the selected frame is a re-photographed image. As another example, the system can also train the sorter using a large number of training images which are either re-photographed images or non-re-photographed images, to obtain as output scores or probability value vectors from multiple images of each training image. The system can train a sorter (e.g., a support vector machine or SVM) to "fuse" the probability value vectors. The system can subsequently compare the output scores (e.g., as output from the SVM) or the probability value vectors with a second predetermined threshold to determine whether the selected frame is a re-photographed image. The first predetermined threshold and the second predetermined threshold may be selected based on the true positive rate and the false positive rate required to be obtained in the actual system. The true positive rate refers to the ratio of the re-photographed images which can actually be correctly detected or identified using the selected threshold. The false positive rate refers to the ratio of image with errors in the detection results when using the selected threshold.

In some embodiments, the first image and the second image can be zoomed to a same size, and (their respective representative multichannel RGB values at various pixel locations) can be concatenated to form a multichannel image, and the first neural network can extract and sort features of the multichannel image to obtain a score for the multichannel image. The system can then use the obtained score for the multichannel image as the basis to indicate the selected frame as re-photographed.

In some embodiments, prior to operation 202, the system (either the client device or the server) can evaluate the sequence of video frames to determine a level of quality of the target object in the frames (e.g., perform a quality evaluation). If the level of quality is not acceptable (e.g., not greater than a predetermined quality threshold), either the client device or the server can generate a message to the user to improve the quality of the captured target object. The message can prompt the user to improve the quality of the captured target object. For example, the prompt can instruct the user to capture text, image, audio, or video data via a component on the client device (e.g., a keypad, a voice-capturing component, or an image-capturing component).

Prior to operation 202, the system can also obtain multiple sample images, evaluate the target object in the sample images to determine a level of quality, and select a set of sample images where the level of quality is acceptable (e.g., greater than a predetermined threshold). The system can select the set of sample images from, e.g.: multiple static images; a sequence of video frames; and one or more continuous video frames with the acceptable level of quality from a predetermined time lapse of a sequence of video frames.

Figure 3A:
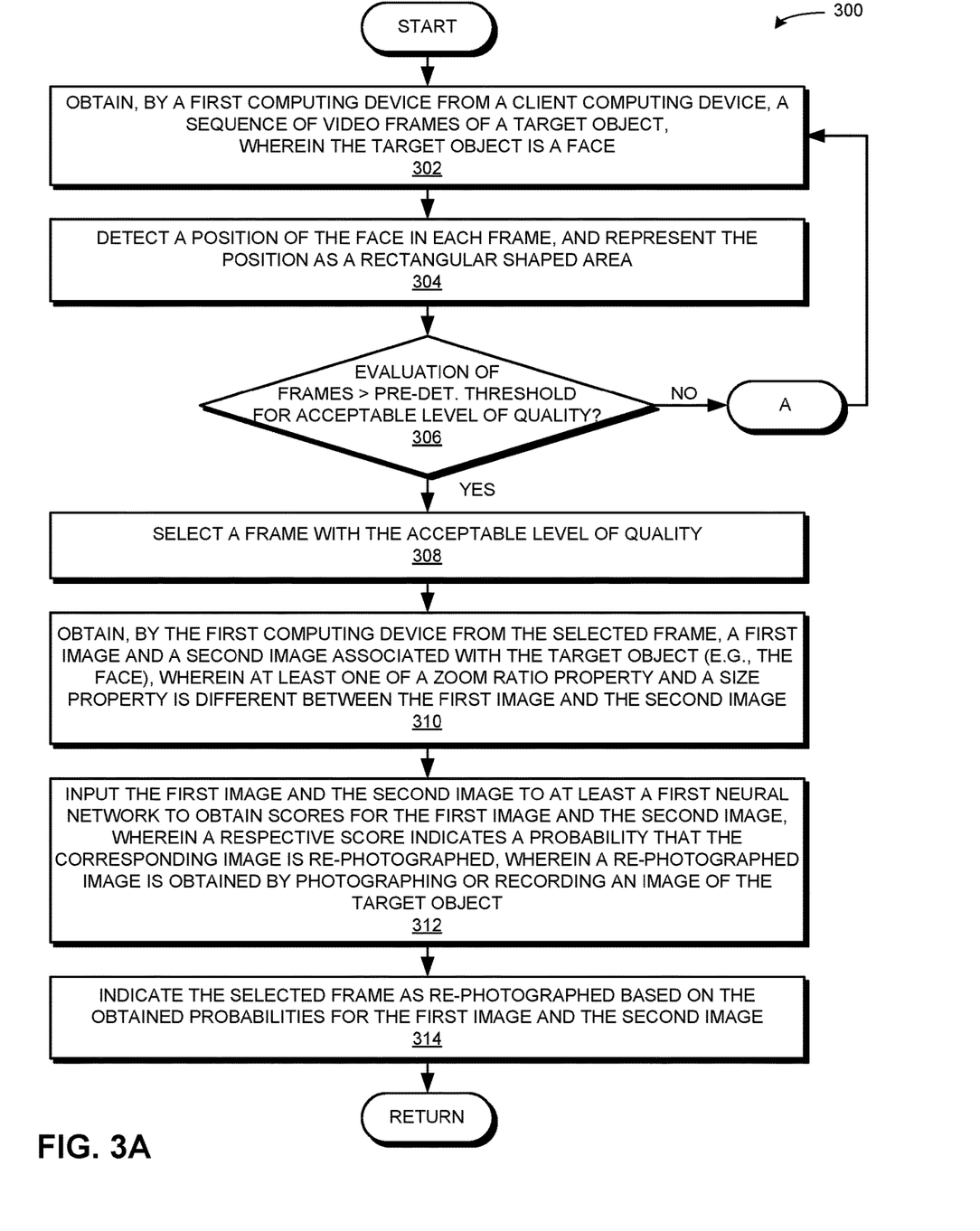
FIG. 3A presents a flowchart illustrating a method for facilitating identification of re-photographed images of faces, in accordance with an embodiment of the present application.

Exemplary Method for Facilitating Identification of Re-Photographed Images: Target Object is a Face FIG. 3A presents a flowchart 300 illustrating a method for facilitating identification of re-photographed images of faces, in accordance with an embodiment of the present application. During operation, the system obtains, by a first computing device from a client computing device, a sequence of video frames of a target object, wherein the target object is a face (operation 302). The system detects the position of the face in each frame, and represents the position as a rectangular shaped area (operation 304). That is, the system determines position information of the face in a respective frame. The system can use any facial detection technology, as described below.

The system evaluates the sequence of video frames to determine a set of frames with an acceptable level of quality based on scores for features associated with a respective frame (decision 306). The scores can be determined based on a first score for a posture, a second score for a brightness, and a third score for a definition, as described below.

Figure 3B:
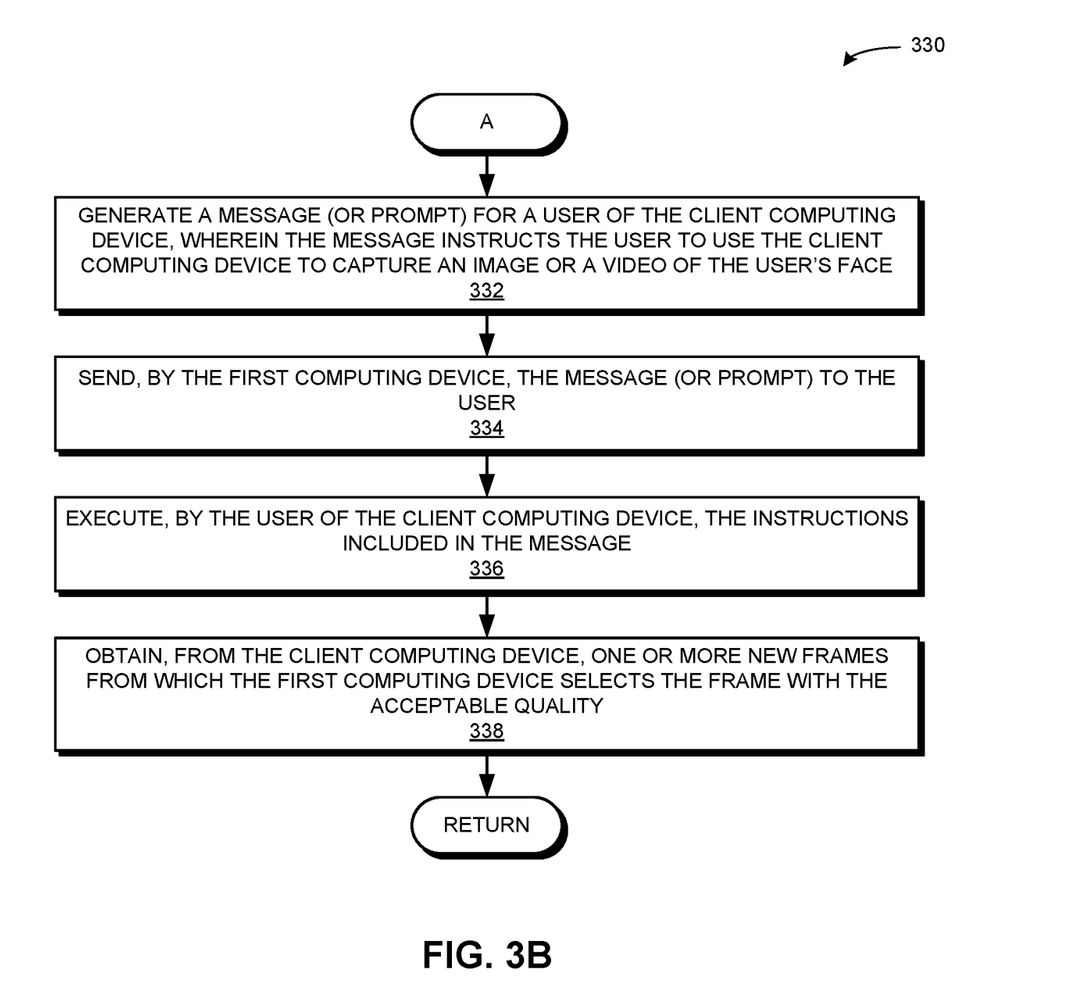
FIG. 3B presents a flowchart illustrating a method for facilitating identification of re-photographed images of faces, in accordance with an embodiment of the present application.

If the result of the evaluation is not greater than a predetermined threshold for the acceptable level of quality (decision 306), the operation continues as described at Label A of FIG. 3B. If the result of the evaluation is greater than the predetermined threshold for the acceptable level of quality (decision 306), the system selects a frame (e.g., from the determined set of frames with the acceptable level of quality) with the acceptable level of quality (operation 308). The system can send the selected frame (along with the previously detected position information of the face in the selected frame) to the next operation (operation 310).

The system can subsequently obtain, from the selected frame, a first image and a second image associated with the target object (e.g., the face), wherein at least one of a zoom ratio property and a size property is different between the first image and the second image (operation 310, which is similar to operation 202 of FIG. 2). The first image and the second image are obtained from the selected frame based on the previously detected facial position information, and correspond to the original target object (i.e., the detected face). Exemplary methods for obtaining the first and the second image, along with exemplary first and second images, are described below in relation to FIG. 5.

The system inputs the first image and the second image to at least a first neural network to obtain scores for the first image and the second image, wherein a respective score indicates a probability that the corresponding image is re-photographed, wherein a re-photographed image is obtained by photographing or recording an image of the target object (operation 312, which is similar to operation 204 of FIG. 2). Thus, the system determines whether the selected frame is a re-photographed image. That is, the system classifies or indicates the selected frame as re-photographed based on the obtained probabilities for the first image and the second image (operation 314, which is similar to operation 206 of FIG. 2).

FIG. 3B presents a flowchart 330 illustrating a method for facilitating identification of re-photographed images of faces, in accordance with an embodiment of the present application. During operation, the system generates a message (or prompt) for a user of the client computing device, wherein the message instructs the user to use the client computing device to capture an image or a video of the user's face (operation 332). The message can include instructions for the user to capture an image or record a video of the user's face, e.g., from a certain angle or direction, or for a certain period of time, or under a certain type of environmental condition (based on, e.g., lighting, indoor/outdoor setting, distance of image-capturing component from the face, etc.). The system sends, by the first computing device, the message (or prompt) to the user (operation 334). The user of the client computing device executes the instructions included in the message (operation 336). The system obtains, from the client computing device, one or more new frames from which the first computing device selects the frame with the acceptable quality (operation 338), as in operation 308 of FIG. 3A.

In one embodiment, a user can log into his user account for a certain application via an identification authentication process which involves AFR and liveness detection. For example, the user can capture a photo or a video via an image-capturing component on a client device, and send the photo or video to a computing device. The computing device can collect the photo or video, identify or detect facial position information, and determine whether the face in the collected photo or video at the detected facial position is a re-photographed image of the user's face or a real image. If the system determines that the collected photo or video is a re-photographed image, the system can provide feedback to the user via an output unit or component on the client device (such as a display device or a speaker). If the system determines that the collected photo or video is not a re-photographed image, the system can further compare the collected photo or video to a previously stored facial image registered by the user. If the results match (e.g., the comparison of the collected photo or video to the previously registered and stored facial image), the system can confirm a successful authorization of the identity of the user, and can subsequently log the user into his respective account. Thus, the embodiments described herein can improve the accuracy and security of identification verification and identification authentication.

Exemplary Facial Detection Method

As described above in relation to operation 304, the system can use any facial detection technology or method on the sequence of video frames. For example, if the system uses a facial detection method based on a local binary model and the Adaboost algorithm, operation 304 may be implemented as follows. First, the system can reduce the sizes of the input images multiple times at intervals by a factor of 0.8, in order to obtain a series of images with reduced sizes. For example, the series of images can include a first set of input images reduced by a factor of 0.8, and a set second of input images reduced by a factor of 0.64. Second, the system can scan each of the reduced size images, using a 24×24 window with a step size of 2 pixels. For each scanned position, the system can extract a series of preset local binary mode features, and map the score reflecting the possibility that the current position corresponds to a human face. The system can select the local binary features and construct the mapping function by training on a large quantity of facial and non-facial samples. The system can obtain a final score by adding up the calculated scores from the current position, and compare the final score to a predetermined threshold to determine whether the current position corresponds to human face. Third, if the system determines that the current position corresponds to a human face, the system can, based on the size ratio relationship between the reduced size images on the current position to the input images, reversely transform the rectangular shape of size 24×24 as the corresponding size of the face in the input image. Fourth, the system can fuse all the facial rectangular shapes detected on the input images, and can further combine all rectangular shapes with an overlapping area ratio of greater than a threshold (e.g., 0.7). The coordinates of the combined rectangular shapes are the average values of the rectangular shapes prior to being combined, which allows the system to obtain the final facial position detection result.

Evaluating the Video Frames to Determine an Acceptable Level of Quality on Three Scores As discussed above in relation to decision 306 of FIG. 3A, the system can evaluate the sequence of video frames to determine an acceptable level of quality. When the imaging quality of the face is low (e.g., the size of the face is very small, the face is not directly facing the capturing device, the lighting is low, or movement results in a blurry face, etc.), it may be difficult for the system to identify a re-photographed image. Thus, the system can perform this evaluation in order to select several frames with an acceptable level of quality. The evaluation can be based on calculating three scores: a posture score; a brightness score; and a definition score.

Figure 4:
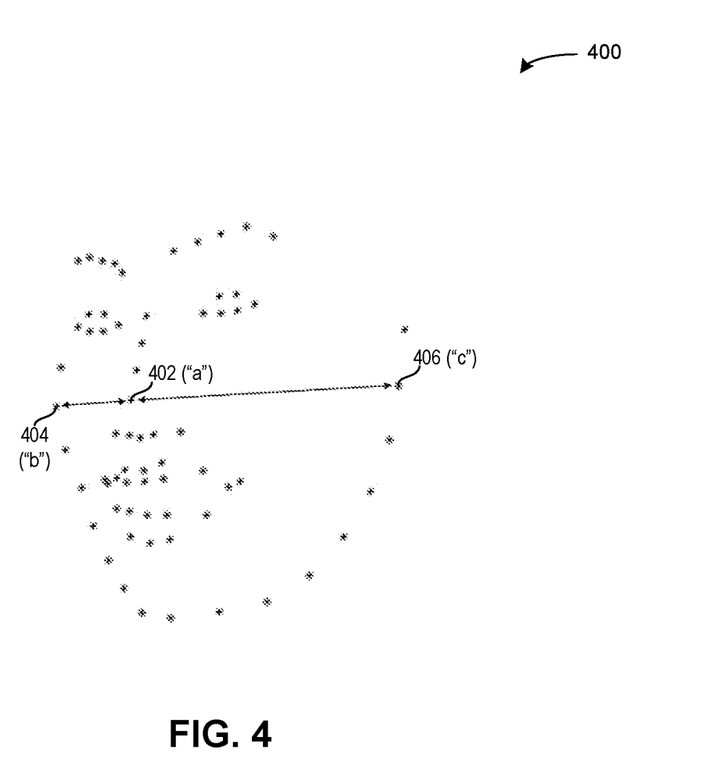
FIG. 4 presents a plurality of facial key points for calculating a posture score, in accordance with an embodiment of the present application.

To calculate the posture score, the system can identify the position of a plurality of key facial points, based on various methods, including active shape model, active appearance model, supervised descent method, regression method based on local binary features, etc.

FIG. 4 presents a plurality of facial key points 400 for calculating a posture score, in accordance with an embodiment of the present application. In FIG. 4, the distance between the point of the nose tip (point 402 or "a")) and the key point on the facial profile that is closest to the nose tip (point 404 or "b") can be denoted as "ba," while the distance between the point of the nose tip (point 402 or "c") and another key point on the other side of the facial profile in a symmetric position with respect to point 404 (point 406) can be denoted as "ca." The result of the shorter distance divided by the longer distance can be used as the posture score: min (ba, ca)/max (ba, ca).

To calculate the brightness score, the system can determine the average brightness of the face, i.e., the average value of the brightness of all pixels in the rectangular shaped area which represents the detected facial position. The brightness of a pixel can be represented by a number between 0 and 1, and can be compared to a predetermined high threshold ($T_H$) and a predetermined low threshold ($T_L$) for brightness. When the average value is greater than the predetermined high threshold ($T_H$), the brightness score can be calculated as: 1−|average value−$T_H$|. When the average value is less than the predetermined low threshold ($T_L$), the brightness score can be calculated as: 1−|$T_L$−average value|. When the average value is less than or equal to the predetermined low threshold ($T_L$), the brightness score is equal to 1.

To calculate the definition score, the system can calculate the gradient amplitude value with respect to any of the pixels in the rectangular shaped area which represents the detected facial position. The system can calculate the total of the amplitudes that are greater than a predetermined high threshold, and then divide the calculated total by the total of the amplitudes that are greater than the predetermined low threshold. This results in the definition score.

Exemplary Images Associated with a Face in a Frame; and Obtaining the Exemplary Images Based on Three Methods FIG. 5 presents exemplary images associated with a face in a frame 502, wherein the exemplary images are obtained based on three methods, in accordance with an embodiment of the present application. A frame 502 can have a size of, e.g., 640×480 pixels (corresponding to length by width, in pixels). The system can detect facial position information for the target object (i.e., the face) in frame 502, as a rectangular shaped facial area 506. In a first method 516, the system can obtain (e.g., cut) an image of a first size (e.g., 128×128 pixels) from the center of the position of rectangular shaped facial area 506 (e.g., area 504, which has a size of 180×180 pixels) to obtain an image 526. The zooming ratio of image 526 to area 504 is 128/128 (or 1/1) in both the length direction and the width direction. That is, because there is no zooming involved in method 516, and the obtained image is merely cut directly from the target image, the zoom ratio property value is 1.

In a second method 514, the system can obtain (e.g., cut and zoom) an image by cutting and zooming rectangular shaped facial area 506 (which has a size of 180×180 pixels) to a second size (e.g., 128×128 pixels) to obtain an image 524. The zooming ratio of image 524 to rectangular face shaped area 506 is 128/180 in both the length direction and the width direction.

In a third method 512, the system can obtain (e.g., zoom entire frame) an image by zooming the entirety of the image in frame 502 (which has a size of 640×480 pixels) to a third size (e.g., 128×128 pixels) to obtain an image 522. The zooming ratio of image 522 to image frame 502 is 128/640 in the length direction, and 128/480 in the width direction.

In these above examples, the system obtains the target images 522, 524, and 526 via three different methods, and in each of the obtained target images 522, 524, and 526, the image size is the same (e.g., 128×128 pixels), and the zooming ratio is different.

In some embodiments, the image sizes of the target images may be different, or both the image sizes and the zooming ratio property may be different. For example, given an original image or frame size of 640×480 pixels, the system can detect facial position information in a rectangular shaped area with a size of 180×180. Using method 516, the system can obtain an image of a first size (e.g., 180×180) from the rectangular shaped facial area (in this case the entirety of the area), which results in a zooming ratio of 1/1 in both the length direction and the width direction. Using method 514, the system can obtain an image by cutting and zooming the rectangular shaped facial area 506 (which has a size of 180×180 pixels) to a second size (e.g., 160×160 pixels), which results in a zooming ratio of 160/180 in both the length direction and the width direction. Using method 512, the system can obtain an image by zooming the entirety of the image in the frame (which has a size of 640×480 pixels) to a third size (e.g., 256×256 pixels), which results in a zooming ratio of 256/640 in the length direction and 256/480 in the width direction.

Exemplary Computer System and Device

Figure 6:
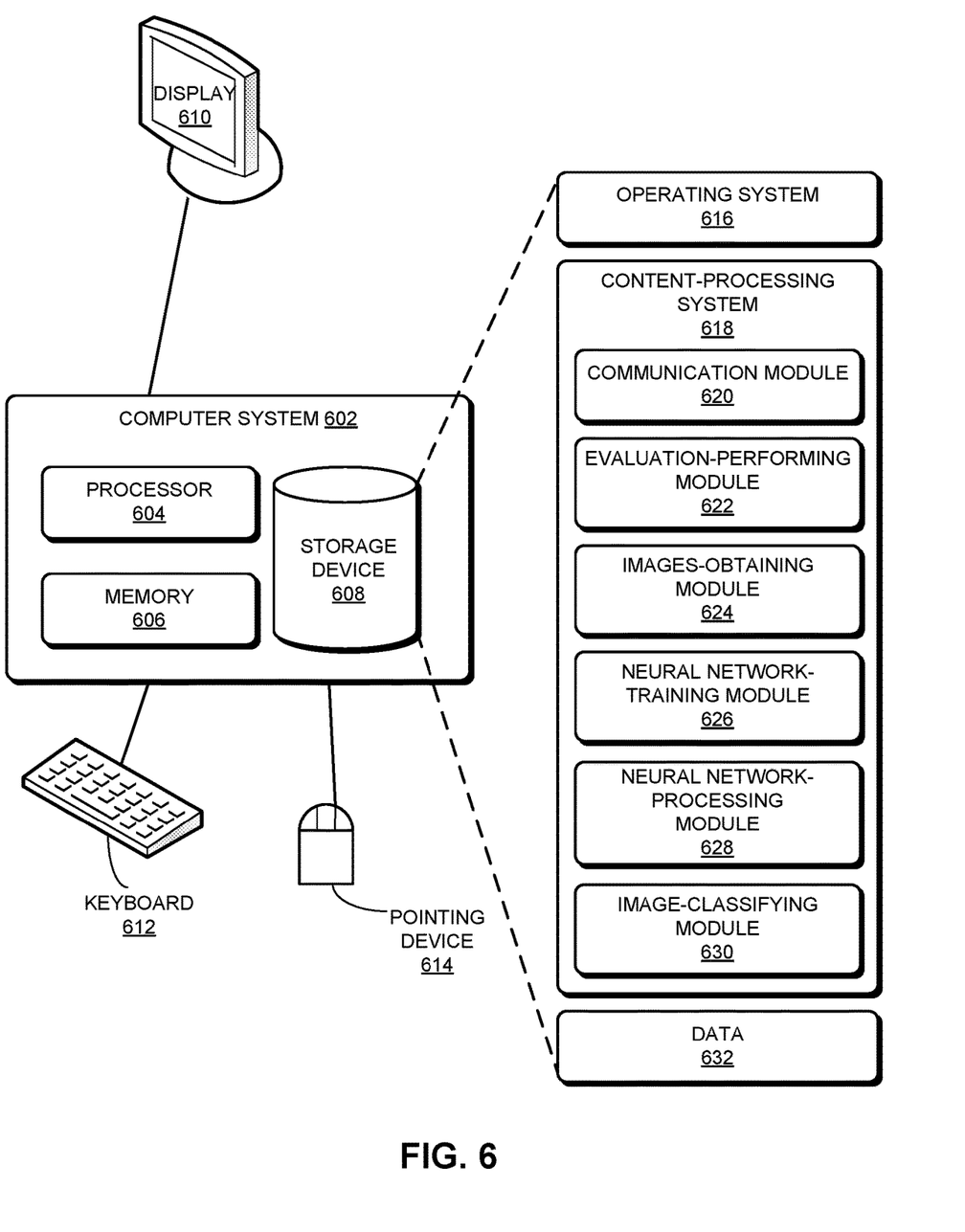
FIG. 6 illustrates an exemplary computer system that facilitates identification of re-photographed images, in accordance with an embodiment of the present application.

FIG. 6 illustrates an exemplary computer system 602 that facilitates identification of re-photographed images, in accordance with an embodiment of the present application. Computer system 602 includes a processor 604, a memory 606, and a storage device 608, which can communicate with each other via, e.g., a bus. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 632. Computer system 602 can be a computing device, such as server 106 in FIG. 1.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, e.g., to/from a client device, a device or group of devices, a server, and a neural network (communication module 620).

Content-processing system 618 can further include instructions for obtaining, by a computing device, a sequence of video frames of a target object (communication module 620). Content-processing system 618 can include instructions for selecting a frame with an acceptable level of quality (evaluation-performing module 622). Content-processing system 618 can include instructions for obtaining, from the selected frame, a first image and a second image associated with the target object, wherein at least one of a zoom ratio property and a size property is different between the first image and the second image (images-obtaining module 624). Content-processing system 618 can include instructions for inputting the first image and the second image to at least a first neural network to obtain scores for the first image and the second image, wherein a respective score indicates a probability that the corresponding image is re-photographed, wherein a re-photographed image is obtained by photographing or recording an image of the target object (neural network-processing module 628). Content-processing system 618 can also include instructions for indicating the selected frame as re-photographed based on the obtained probabilities for the first image and the second image (image-classifying module 630).

Content-processing system 618 can additionally include instructions for evaluating the sequence of video frames to determine a set of frames with the acceptable level of quality (evaluation-performing module 622), and for determining scores for features associated with a respective frame (evaluation-performing module 622).

Content-processing system 618 can also include instructions for training the neural network or a sorter based on training images which are either re-photographed images or non-re-photographed images (neural network-training module 626). Content-processing system 618 can include instructions for generating a message for the user of the client computing device, wherein the message instructs the user to use the client computing device to capture an image or a video of the user's face (evaluation-performing module 622). Content-processing system 618 can also include instructions for, in response to sending the message to the user (communication module 620), obtaining, from the client computing device, one or more new frames from which the computing device selects the frame with the acceptable quality (communication module 620).

Data 632 can include any data that is required as input or that is generated as output by the methods and/or processes described in this disclosure. Specifically, data 632 can store at least: an image; a video frame; an image frame; a frame; a sequence of video frames; a zoom ratio property; a size of an image; a length; a width; a length-based zoom ratio; a width-based zoom ratio; a neural network; a sorter; training images or samples; an acceptable level of quality; a predetermined threshold for an acceptable level of quality; a first predetermined threshold; a second predetermined threshold; an image of a first size; an image which is zoomed to a second size; a frame zoomed to a third size; an output vector; a probability vector value; a multichannel image; a score; a score which indicates a probability that a corresponding image is re-photographed; an evaluation; a posture score; a brightness score; a definition score; a target object; a target object which is a face; a detect facial position; position information of a face in a frame; a message; instructions; and one or more new frames.

Figure 7:
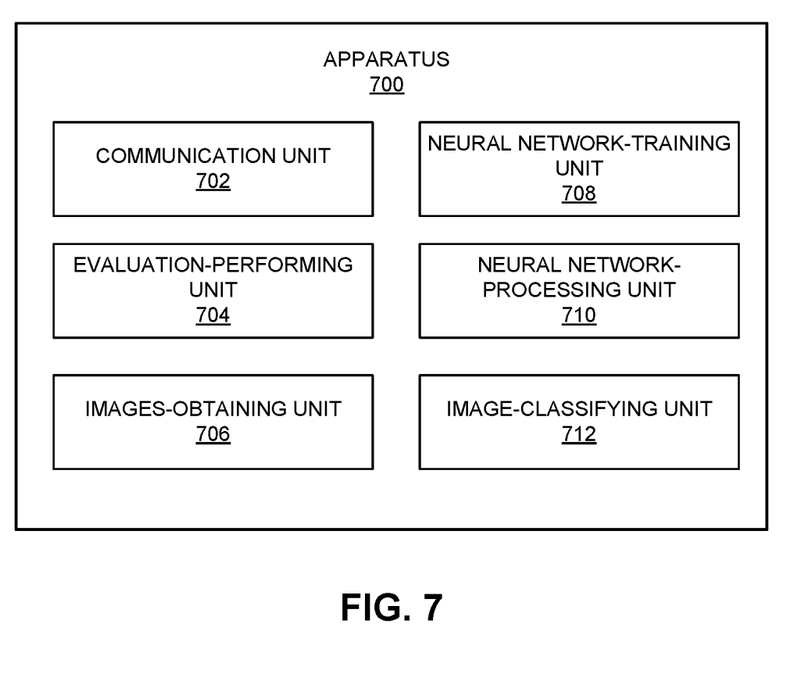
FIG. 7 illustrates an exemplary apparatus or device that facilitates identification of re-photographed images, in accordance with an embodiment of the present application.

FIG. 7 illustrates an exemplary apparatus or device 700 that facilitates identification of re-photographed images, in accordance with an embodiment of the present application. Device 700 can comprise a plurality of units or apparatuses which may communicate with one another via a wired, wireless, or electrical communication channel. Device 700 may be realized using one or more integrated circuits, and may include fewer or more units or apparatuses than those shown in FIG. 7. Further, device 700 may be integrated in a computer system, or realized as a separate device which is capable of communicating with other computer systems and/or devices. Specifically, device 700 can comprise units 702-712 which perform functions or operations similar to modules 620-630 of computer system 602 of FIG. 6, including: a communication unit 702; an evaluation-performing unit 704; an images-obtaining unit 706; a neural network-training unit 708; a neural network-processing unit 710, and an image-classifying unit 712.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

One embodiment provides a method for identifying re-photographed images. During operation, a system performs the method by acquiring at least two types of object images associated with the target object based on the position detection result of the target object in the original image, wherein at least one of the following properties of the object images of different types are different: a zooming ratio and an image size. The system carries out a re-photographing identification processing with respect to the at least two types of target images. The system determines whether the original image is a re-photographed image of the target object, according to the re-photographing identification results of the at least two types of target images.

In some embodiments, acquiring at least two types of object images associated with the target object comprises at least two of: obtaining the object image by cutting out an image of a first size from the area where the target object in the original image is located; obtaining the object image by cutting out an image from the area where the target object in the original image is located and then zooming the cutout image to a second size; and obtaining the object image by zooming the original image to a third size.

In some embodiments, carrying out re-photographing identification processing with respect to the at least two types of target images comprises: processing at least two types of target images by adopting the re-photographing identification model to obtain the re-photographing identification results of at least two types of target images, wherein the re-photographing identification model comprises: one neural network; or, the re-photographing identification model comprises: at least two neural networks and one sorter, wherein one neural network is used for processing one type of target image, and the output vectors of at least two pre-determined layers of the neural networks (e.g., the pooling layer) are output to the sorter after connection.

In some embodiments, prior to acquiring at least two types of object images associated with the target object based on the position detection result of the target object in the original image, the system: carries out quality evaluation with respect to the target object in the original image; and in response to the quality evaluation result with respect to the target object not meeting the preset quality requirements, generates prompting information, wherein the prompting information is used for prompting the user to improve the capturing quality of the target object.

In some embodiments, prior to acquiring at least two types of object images associated with the target object based on the position detection result of the target object in the original image, the system: acquires multiple sampling images; determines the quality evaluation result of the target object in any of the sampling images; and selects the sampling images with the quality evaluation results of the target objects meeting the preset quality conditions, as the original images.

In some embodiments, the target object comprises a human face.

Another embodiment provides an apparatus for identifying re-photographed images. The apparatus comprises an image-processing module configured to acquire at least two types of object images associated with the target object based on the position detection result of the target object in the original image; wherein at least one of the following properties of the object images of different types are different: a zooming ratio and an image size. The apparatus further comprises a first identification module configured to carry out re-photographing identification processing with respect to the at least two types of target images. The apparatus further comprises a second identification module configured to determine whether the original image is a re-photographed image of the target object, according to the re-photographing identification results of the at least two types of target images.

Another embodiment provides a smart terminal device, comprising an image-capturing unit and an image-processing unit. The image-capturing unit is configured to capture original images. The image-processing unit is configured to: acquire at least two types of object images associated with the target object based on the position detection result of the target object in the original image, wherein at least one of the following properties of the object images of different types are different: a zooming ratio and an image size; carry out re-photographing identification processing with respect to the at least two types of object images; and determine whether the original image is a re-photographed image of the target object, according to the re-photographing identification results of the at least two types of object images.

Another embodiment provides an apparatus for identifying re-photographed images, comprising: a processor; and a storage device coupled to the processor and storing instructions, which when executed by the processor cause the processor to perform a method for identifying re-photographed images, according to any one of the methods described herein.

Another embodiment provides a computer readable storage medium configured to store instructions for identifying re-photographed images, which when executed by the processor cause the processor to perform a method for identifying re-photographed images, according to any one of the methods described herein.

Another embodiment provides a data-processing method, comprising: obtaining a first image information corresponding to a target object; obtaining a second image information corresponding to the target object, wherein at least one of the following properties of the object images of different types are different: a zooming ratio and an image size; and authenticating the target object based on the first and second image information.

In some embodiments, the data-processing method further comprises displaying a prompt indicating whether the target object is successfully authenticated.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating identification of re-photographed images, the method comprising:
    obtaining, by a computing device, a sequence of video frames of a target object;
    selecting a frame with an acceptable level of quality;
    obtaining, from the selected frame, a first image and a second image associated with the target object, wherein at least one of a zoom ratio property and a size property is different between the first image and the second image;
    inputting the first image and the second image to at least a first neural network to obtain scores for the first image and the second image, wherein a respective score indicates a probability that the first image or the second image is re-photographed, wherein a re-photographed image is obtained by photographing or recording an image of the target object; and
    indicating the selected frame as re-photographed based on the obtained probabilities for the first image and the second image.

2. The method of claim 1, wherein the first image and the second image are one or more of:
    an image of a first size selected from a first area of the target object in the selected frame;
    an image which is selected from a second area of the target object in the selected frame, and which is zoomed to a second size; and
    the selected frame zoomed to a third size,
    wherein the first size, the second size, and the third size are a same size or a different size.

3. The method of claim 1, wherein the zoom ratio property is a ratio of a target image size of the first image or the second image to an original image size of a target zooming area in the selected frame, and wherein the zoom ratio property includes a length-based ratio and a width-based ratio.

4. The method of claim 1, wherein the first image and the second image are inputted to the first neural network and at least one second neural network and a sorter, and
    wherein output vectors of at least two pre-determined layers of the first neural network and the at least one second neural network are output to the sorter.

5. The method of claim 1, wherein the first image and the second image are zoomed to a same size and are concatenated to form a multichannel image, wherein the first neural network extracts and sorts features of the multichannel image to obtain a score for the multichannel image, and
    wherein indicating the selected frame as re-photographed is further based on the obtained score for the multichannel image.

6. The method of claim 1, wherein selecting the frame with the acceptable level of quality comprises:
    evaluating the sequence of video frames to determine a set of frames with the acceptable level of quality, wherein the acceptable level of quality is greater than a first predetermined threshold,
    wherein evaluating the sequence of video frames is based on determining scores for features associated with a respective frame, including a first score for a posture, a second score for a brightness, and a third score for a definition.

7. The method of claim 1, wherein the target object is a face.

8. The method of claim 7, wherein prior to selecting the frame, the method further comprises:
    determining position information of the face in a respective frame of the sequence of video frames; and
    representing the position information as a rectangular shaped area,
    wherein the position information is inputted along with the first image and the second image to the first neural network.

9. The method of claim 7, wherein the video frames are obtained from a client computing device associated with a user, and wherein in response to determining that there are no frames with the acceptable level of quality, the method further comprises:
    generating a message for the user of the client computing device, wherein the message instructs the user to use the client computing device to capture an image or a video of the face of the user; and
    in response to sending the message to the user, obtaining, from the client computing device, one or more new frames from which the computing device selects the frame with the acceptable level of quality.

10. The method of claim 1, wherein indicating the selected frame as re-photographed is further based on one or more of:
    reviewing the obtained probabilities, which involves:
        selecting a largest value from the obtained probabilities; and
        in response to determining that the largest value is greater than a first predetermined threshold, indicating the selected frame as re-photographed; and
    training a sorter to process the obtained probabilities, which involves:

training the sorter based on training images which are either re-photographed images or non-re-photographed images to obtain as output scores or probability value vectors from multiple images of each training image; and comparing the output scores or probability value vectors with a second predetermined threshold to indicate if the training image is re-photographed.

11. A computer system for facilitating identification of re-photographed images, the computer system comprising:
a processor; and
a memory coupled to the processor and storing instructions, which when executed by the processor cause the processor to perform a method, the method comprising:
obtaining, by the computer system, a sequence of video frames of a target object;
selecting a frame with an acceptable level of quality;
obtaining, from the selected frame, a first image and a second image associated with the target object, wherein at least one of a zoom ratio property and a size property is different between the first image and the second image;
inputting the first image and the second image to at least a first neural network to obtain scores for the first image and the second image, wherein a respective score indicates a probability that the first image or the second image is re-photographed, wherein a re-photographed image is obtained by photographing or recording an image of the target object; and
indicating the selected frame as re-photographed based on the obtained probabilities for the first image and the second image.

12. The computer system of claim 11, wherein the first image and the second image are one or more of:
an image of a first size selected from a first area of the target object in the selected frame;
an image which is selected from a second area of the target object in the selected frame, and which is zoomed to a second size; and
the selected frame zoomed to a third size,
wherein the first size, the second size, and the third size are a same size or a different size.

13. The computer system of claim 11, wherein the zoom ratio property is a ratio of a target image size of the first image or the second image to an original image size of a target zooming area in the selected frame, and wherein the zoom ratio property includes a length-based ratio and a width-based ratio.

14. The computer system of claim 11, wherein the first image and the second image are inputted to the first neural network and at least one second neural network and a sorter, and
wherein output vectors of at least two pre-determined layers of the first neural network and the at least one second neural network are output to the sorter.

15. The computer system of claim 11, wherein the first image and the second image are zoomed to a same size and are concatenated to form a multichannel image, wherein the first neural network extracts and sorts features of the multichannel image to obtain a score for the multichannel image, and wherein indicating the selected frame as re-photographed is further based on the obtained score for the multichannel image.

16. The computer system of claim 11, wherein selecting the frame with the acceptable level of quality comprises:
evaluating the sequence of video frames to determine a set of frames with the acceptable level of quality, wherein the acceptable level of quality is greater than a first predetermined threshold,
wherein evaluating the sequence of video frames is based on determining scores for features associated with a respective frame, including a first score for a posture, a second score for a brightness, and a third score for a definition.

17. The computer system of claim 11, wherein the target object is a face.

18. The computer system of claim 17, wherein prior to selecting the frame, the method further comprises:
determining position information of the face in a respective frame of the sequence of video frames; and
representing the position information as a rectangular shaped area,
wherein the position information is inputted along with the first image and the second image to the first neural network.

19. The computer system of claim 17, wherein the video frames are obtained from a client computing device associated with a user, and wherein in response to determining that there are no frames with the acceptable level of quality, the method further comprises:
generating a message for the user of the client computing device, wherein the message instructs the user to use the client computing device to capture an image or a video of the face of the user; and
in response to sending the message to the user, obtaining, from the client computing device, one or more new frames from which the computer system selects the frame with the acceptable level of quality.

20. The computer system of claim 11, wherein indicating the selected frame as re-photographed is further based on one or more of:
reviewing the obtained probabilities, which involves:
selecting a largest value from the obtained probabilities; and
in response to determining that the largest value is greater than a first predetermined threshold, indicating the selected frame as re-photographed; and
training a sorter to process the obtained probabilities, which involves:
training the sorter based on training images which are either re-photographed images or non-re-photographed images to obtain as output scores or probability value vectors from multiple images of each training image; and
comparing the output scores or probability value vectors with a second predetermined threshold to indicate if the training image is re-photographed.

* * * * *